United States Patent
Mehnert

(10) Patent No.: US 7,433,778 B2
(45) Date of Patent: Oct. 7, 2008

(54) METHOD AND DEVICE FOR CONTROLLING THE AIR FLOW QUANTITY OF INTERNAL COMBUSTION ENGINES

(76) Inventor: Jens Mehnert, Buchenweg 38, Heinsdorfergrund (DE) 08468

( * ) Notice: Subject to any disclaimer, the term of this patent is extended or adjusted under 35 U.S.C. 154(b) by 24 days.

(21) Appl. No.: 10/598,409

(22) PCT Filed: Mar. 1, 2005

(86) PCT No.: PCT/EP2005/002153

§ 371 (c)(1),
(2), (4) Date: Aug. 28, 2006

(87) PCT Pub. No.: WO2005/085618

PCT Pub. Date: Sep. 15, 2005

(65) Prior Publication Data

US 2007/0198164 A1 Aug. 23, 2007

(30) Foreign Application Priority Data

Mar. 4, 2004 (EP) .................. 10 2004 010 519

(51) Int. Cl.
*G06F 17/00* (2006.01)
*B60T 7/12* (2006.01)

(52) U.S. Cl. ...................... 701/103; 701/114

(58) Field of Classification Search .......... 123/295, 123/361, 399, 478, 480, 90.15, 568.14; 73/119 R, 73/118.1; 701/103, 110, 114; 60/276–278, 60/285, 301
See application file for complete search history.

(56) References Cited

U.S. PATENT DOCUMENTS

| 6,208,131 | B1 * | 3/2001 | Cebis et al. ............... 324/165 |
| 6,390,056 | B1 | 5/2002 | Hertzberg et al. |
| 6,502,388 | B2 * | 1/2003 | Takaku et al. .............. 60/285 |
| 7,258,090 | B2 * | 8/2007 | Kawasaki ............... 123/90.16 |

FOREIGN PATENT DOCUMENTS

| EP | 1134398 A | 9/2001 |
| EP | 1323915 A | 7/2003 |
| EP | 1333158 A | 8/2003 |

* cited by examiner

*Primary Examiner*—Willis R. Wolfe, Jr.
*Assistant Examiner*—Johnny H. Hoang
(74) *Attorney, Agent, or Firm*—David A. Guerra

(57) ABSTRACT

The invention relates to a method for controlling the air flow quantity supplied to an internal combustion engine per operating cycle, without reducing the throttle. The method is characterized in that: an accelerator pedal signal ($\gamma$) is detected, the value thereof depending on the position of the accelerator pedal; a rotational speed signal (n) is detected the value thereof depending on the rotational speed of the internal combustion engine; load collectives are formed from ($\gamma$) and (n); both the load collective-dependent opening time ($t_{Li}$) of a gas outlet in the compression chamber of each cylinder of the internal combustion engine during the compression stroke, and the load collective-dependent fuel injection quantities ($\sim t_{Li}$) per operating cycle and cylinder are determined; and the advance angles are determined according to the load collectives. The inventive method is advantageous in that only negligible fluctuations occur in the respectively introduced air flow quantity over all load regions.

21 Claims, 3 Drawing Sheets

US 7,433,778 B2

Figure 1:
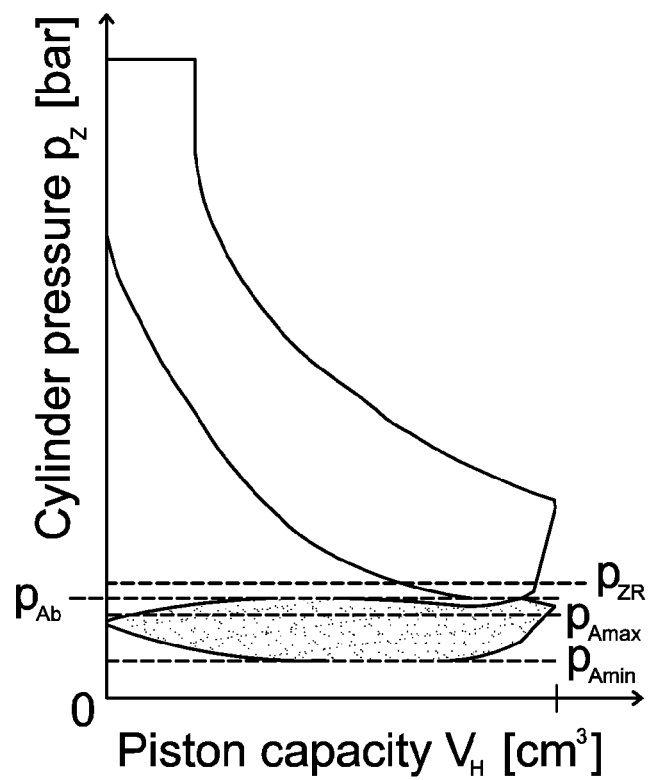

METHOD AND DEVICE FOR CONTROLLING THE AIR FLOW QUANTITY OF INTERNAL COMBUSTION ENGINES

CROSS-REFERENCE TO RELATED APPLICATIONS

This application is an U.S. national phase application under 35 U.S.C. §371 based upon co-pending International Application No. PCT/EP05/02153 filed Mar. 1, 2005. Additionally this U.S. national phase application claims the benefit of priority of co-pending International Application No. PCT/EP05/02153 filed Mar. 1, 2005 and European Patent Application No. EP 10 2004 010 519.7 filed Mar. 4, 2004. The entire disclosures of the prior applications are incorporated herein by reference. The international application was published Sep. 15, 2005 under Publication No. WO 2005/085618 A1.

BACKGROUND OF THE INVENTION

1. Field of the Invention

The invention concerns a method for controlling the air flow of combustion engines with direct fuel injection according to the generic term of claim 1 as well as a device for implementing the method according to the generic term of claim 18.

2. Description of Related Art

The development level and the available implementations of combustion engines with direct fuel injection, in particular according to the generic term of claim 1, are characterized by the fact that the control of the air quantity to be compressed during the compression stroke takes place either by lowering the starting pressure during the intake stroke (Version I) or by early closing of the inlet valve(s) according to the desired load range, also during the intake stroke (Version II).

For Version I, the reduction of the starting pressure in the compression chamber at the start of each compression stroke is achieved by throttling the air flow supplied to the combustion engine upstream of the inlet valve(s). Examples of embodiments of such control of the air flow supplied to a combustion engine are throttle valves, slide valves or control slides (see DE 3720097 A1; DE 19734227 C2, DE 69704595 T2, DE 19502669 C2, DE 19928523 A1, DE 19501150 C2 or DE 10058200 A1). The current load condition of a combustion engine is determined either by measuring the air flow supplied to the combustion engine or by determining the pressure reduction in the air flow supplied to the combustion engine after the respective throttling element. Due to the manner in which this control of the air flow supplied to the combustion engine is implemented, throttling losses occur that reduce the effect of the pressure reduction required for load control during the intake stroke of each cylinder (see Pöhls, Axel: Investigation of a method for controlled exhaust-gas recycling in petrol engines; VDI Verlag GmbH Düsseldorf; Dissertation 2001; IBSN 3-18-345812-8; p 1 or Homburg, Arno: Optical investigation of jet expansion and mixing with direct-injection petrol combustion methods; Faculty for Mechanical Engineering and Electronics, University of Braunschweig; Dissertation 2002; p 12). These losses lead to a reduction of the efficiency, in particular in the partial-load range of the combustion engine (see Weirich, Marko; NOx-reduction by using the SCR method on a petrol engine with direct injection; University of Kaiserslautern, Department of Mechanical Engineering and Process Technology; Dissertation 2001; p3).

Embodiments of Version II with regard to a throttle-free control of the air flow supplied to the combustion engine per work cycle are described in the patent documents DE 19810466 C2, DE 10111991 A1, DE 4341945 A1, DE 19706750 A1, DE 69720356 T2 or DE 3940752 A1, where the supplied air flow is controlled by varying the opening period of the inlet valve(s).

BRIEF SUMMARY OF THE INVENTION

The objective of the invention is to provide a method for controlling the air flow of combustion engines with direct injection which, on the one hand, does not cause throttling losses, in particular in the partial-load range, where Version I serves as a benchmark, and which, on the other hand, differs from the state of the art as described for Version II by ensuring the control of the air flow that is supplied to the combustion engine with relatively little constructive effort, where the supplied air flow should remain approximately constant over all rotation speed and load ranges. This improves the response characteristics during load changes when the combustion engine is operated in non-stationary mode, where the control effort for dynamical parameters, such as the respective waste gas recycling rate or the fuel quantity to be injected is reduced. The desired result is a nearly "steady" load change process with regard to the air quantity to be used during a work cycle, which can be better assessed and controlled, which reduces the emission of pollutants and increases the driving comfort. It is a further objective of the invention to use the almost constant air flow to achieve better coordination with a waste-gas turbocharger than is state of the art and to increase the efficiency of the combustion engine in this way. It is a further objective of the invention to provide a device that implements the method and a combustion engine with improved response characteristics during load changes with low control effort.

These problems are solved with a method and device for controlling the air flow as described in the claims. Advantageous embodiments are described in claims that depend on the independent claims. The invention is described in detail in the following text.

The invention is based on the Seilinger process according to FIG. 1, in particular the low-pressure area that is shown in the p-V-diagram in grey during the intake stroke (relevant for Version I and II) as well as the pressure increase area resulting from the reduction of volume during the compression stroke (relevant for presenting the invention). In contrast with the existing control mechanisms for the air flow supplied to the combustion engine, the invention does not involve control of the cylinder pressure $p_z$ by throttling (Version I of the state of the art) or early closing of the inlet valve(s) (Version II of the state of the art) during the intake stroke to control the air flow per work cycle according to the operating condition between full load and partial load based on load conditions. Load conditions in this context are defined by the accelerator pedal signal ($\gamma$), which depends on the accelerator pedal position and on the rotation speed signal n, which depends on the rotation speed of the combustion engine. The method according to the invention handles the load-dependent control of the air flow supplied to the combustion engine per work cycle by opening the gas outlet of each cylinder of the combustion engine during the compression stroke, where a constant pressure level $p_{ZR}$ is established from the time of opening to the time of closing of the gas outlet in the compression chamber of each cylinder of the combustion engine. They area shown in grey in the p-V-diagram in FIG. 1 between the cylinder pressures $P_{Amin}$ and $P_{Amax}$ falls away, due to the fact that, according to the invention, the cylinder pressure $P_{Amax}$ applies for all load ranges (in particular partial load) of the combustion engine. Therefore, $P_{Amin} = P_{Amax}$ for all load conditions. As a result of the control of the air flow supplied to the combustion engine according to the invention, the proportion of the load change work in the low pressure area of the Seilinger process according to FIG. 1 is reduced. The pressure level of the air flow supplied to the combustion engine remains approximately constant at the pressure $P_{Amax}$ during the intake stroke at all load conditions, due to non-throttling as well as the largely constant opening interval of the inlet valve(s) of the combustion engine. The same applies to the air flow supplied to the combustion engine at each work cycle, as there is no limitation resulting from the control of this parameter during the intake stroke according to the invention, in contrast with Versions I and II as described.

The term "gas outlet in the compression chamber" refers to a device that makes it possible to duct gaseous substances, e.g. a combustion air mixture, out of the compression chamber of a cylinder, e.g. into an exhaust gas pipe. The gas outlet has the means to close the gas outlet opening in a controllable manner. These means are, for example, valves that can be operated by an actuator or an adjustment device. According to a special embodiment, the gas outlet according to the invention may be the exhaust channel of a cylinder that is closed by a variable controllable exhaust valve.

According to a further embodiment, the gas outlet according to the invention may be a further gas outlet channel in addition to the exhaust channel of the cylinder, which can be closed by a controllable valve and can be opened or closed on request. The term "gas outlet in the compression chamber" further implies that the gas outlet according to the invention leads into the compression chamber.

The time to open the gas outlet in the compression chamber of each cylinder of the combustion engine $\alpha_{HLiGO}$ depends on the closing time of the respective inlet valve(s) (ES) as well as the current exhaust gas counter pressure at the exhaust valve(s). In principle, the inlet valve(s) must first be closed. The time ES results from the control diagram of the respective combustion engine according to the crank angle $\alpha_{HLiS}$ at ES. Secondly, the pressure level $P_{ZR}$ has to be selected so that it is slightly above the exhaust gas counter pressure $p_{Ab}$ at the exhaust valve(s) at the time when the gas outlets in the compression chamber of the combustion engine are open, where no internal exhaust gas recycling is intended in this case. The pressure drop $p_{ZR} > P_{Ab}$, with $$p_{ZR} \sim 1.02 * P_{Ab} \qquad \text{Equation 1}$$

prevents the possible influx of exhaust gas into the compression chamber during the compression stroke by controlling the air flow supplied to the combustion engine by opening the gas outlet in the compression chamber of each cylinder of the combustion engine, which is connected to the exhaust gas pipe of the combustion engine near the exhaust valve(s) (Equation 1).

If internal gas recycling is intended, the time of opening the gas outlet in the compression chamber of the combustion engine has to be selected so that a pressure gradient is created at which $p_{ZR} < p_{Ab}$ applies. The time for opening the gas outlet in the compression chamber of each cylinder of the combustion engine must in this context be chosen earlier according to the pressure conditions, i.e. relating to the compression stroke closer to the bottom dead centre. The time for opening the gas outlet in the compression chamber of each cylinder of the combustion engine is determined by the desired degree of exhaust gas recycling rate that is to be implemented internally and has to be determined by using index measurements specific for the combustion engine by defining the pressure drop ($p_{ZR}$ : $p_{Ab}$) depending on the pressure conditions as function of the crank angle $\alpha_{HLiGO}$.

The opening period $t_{Li}$ and thereby the closing time $\alpha_{HLiGS}$ of the gas outlet in the compression chamber of each cylinder of the combustion engine depends on the respective, desired load range $p_{msoll}$ of the combustion engine, which is characterized by the load conditions, equivalent to the position of the throttling element or the opening period of the inlet valves for embodiments according to the state of the art (see Version I or II) for regulating the air flow supplied to the combustion engine. It should be considered for the selection of $t_{Li}$ that $t_{Li}$ is inversely proportional to $p_{msoll}$, which implies the following relationships for the two load extremes of the combustion engine:

$$P_{mSoll,V} \rightarrow \text{Max} \ldots t_{Li}=0 \qquad \text{Equation 2}$$

$$p_{mSoll,L} \rightarrow 0 \ldots t_{Li}=\text{Max} \qquad \text{Equation 3}$$

Full load (maximum middle pressure $P_{mSoll,V}$ Equation 2) as well as partial load idling (minimum middle pressure $P_{mSoll,L}$ Equation 3).

These dependencies described with regard to the opening period $t_{Li}$ of the gas outlet in the compression chamber of each cylinder of the combustion engine can be used in combination with indicator measurements at the respective combustion engine to determine the pressure $P_{ZR}$ in the compression chamber of the combustion engine as a function of the load conditions and to represent it as a function of the crank angle $\alpha$. The control of the air flow supplied to the combustion engine during this indicator measurement is based on the existing control according to Version I or II in order to obtain initial data. Based on these indicator measurements, the times for closing the gas outlet in the compression chamber of each cylinder of the combustion engine $t_{LiS}$ can be determined for specific load conditions and combustion engines as a function of the crank angle $\alpha$. The closing time $t_{LiS}$ results from the intersection of $p_{ZR}$ with the appropriately indicated cylinder pressure $p_{ZI}$ during the compression stroke. This is done by presenting the load-condition-specific, indicated as cylinder pressure $p_{ZI}$ in the p-V-diagram according to FIG. 1, and by subsequently determining the distance of the intersection $p_{ZR}$: $p_{ZI}$ with the x-axis (stroke volume) in parallel to the Y-axis (cylinder pressure). In this way, the load-condition-specific stroke volume $V_{HLi}$ can be determined, for which $p_{ZR}=p_{ZI}$ applies. From the load-condition-specific stroke volume $V_{HLi}$ determined in this way, the time $t_{LiS}$ for closing the gas outlet in the compression chamber of each cylinder can be calculated. For this purpose, it is necessary first to determine the respective crank angle for opening and closing the gas outlet in the compression chamber of each cylinder of the combustion engine. As the load-condition-specific opening time $\alpha_{HLiGO}$ can be calculated from the control diagram of the respective combustion engine according the explanations provided above, the calculation of the closing time $\alpha_{HLiGS}$ is provided below. The following relationship (Equation 4) is used to convert the load-condition-specific stroke volume $V_{HLi}$ to degree crank angle $\alpha_{HLiGS}$ for the closing time of the gas outlet in the compression chamber of each cylinder of the combustion engine:

$$V_{HLi} = V_H + V_C \qquad \text{Equation 4}$$

with

-continued $$V_{HLi} = \frac{\pi}{4} \cdot D^2 \cdot H_{HLi} \qquad \text{Equation 5}$$

from which follows $$H_{HLi} = \frac{(V_{HLi} - V_C) \cdot 4}{\pi \cdot D^2} \qquad \text{Equation 6}$$

with $$h_{HLi} = H_{HLi} - x \qquad \text{Equation 7}$$

This facilitates the calculation of the load-condition-specific crank angle $\alpha H_{LiS}$ for closing the gas outlet in the compression chamber of each cylinder of the combustion engine as a function of the load-condition-specific distance of the centre of the top end of the connecting rod $h_{HLi}$ as follows:

$$\cos\alpha_{HLiS} = \frac{r^2 + h_{HLi}^2 - l^2}{2 \cdot r \cdot h_{HLi}} \qquad \text{Equation 8}$$

It follows that the load-condition-specific stroke volume $V_{HLi}$ can be used to calculate exactly the respective crank angle $\alpha_{HLiS}$, which is defined as the crank angle at the time the gas outlet in the compression chamber of each cylinder of the combustion engine closes. Subsequently, the load-condition-specific opening period $t_{HLi}$ of the gas outlet in the compression chamber of each cylinder can be calculated. For this purpose, the appropriate load-condition-dependent crank angle range $\alpha_{HLi}$ in which the gas outlet in the compression chamber of each of the cylinders of the combustion engine is opened, is calculated first. This is achieved by subtracting the respective load-condition-specific crank angles with regard to opening and closing the gas outlet in the compression chamber of each cylinder of the combustion engine (Equation 9).

$$\alpha_{HLi} = \alpha_{HLiO} - \alpha_{HLiS} \qquad \text{Equation 9}$$

Based on this intermediate result (Equation 9), the opening period $t_{HLi}$ of the gas outlet in the compression chamber of each cylinder of the combustion engine can be calculated as follows (Equation 10).

$$t_{HLi} = \frac{\alpha_{HLi}}{2 \cdot \pi \cdot n_{HLi}} \qquad \text{Equation 10}$$

To ensure that sufficient time remains to inject fuel into the combustion chamber at the end of the compression stroke, in particular in the lower partial-load-range of the combustion engine (see Equation 2), individual cylinders are switched off when critical conditions of the crank angle with regard to closing of the gas outlets in the compression chamber of each cylinder of the combustion engine $\alpha_{HLiS}$ in relation to the start of the injection $t_{EHLi}$ occur. The switch-off is load-condition-specific and cylinder-specific and is performed by reducing the injected quantity $\sim t_i$ to zero until, in extreme cases, only one cylinder of the combustion engine is fired. As a result, the load range of the still fired cylinder(s) of the combustion engine increases, which shifts the time $\alpha_{HLiS}$ for closing the gas outlet in the compression chamber of the fired cylinders of the combustion engine in the direction of the top dead centre. The drag torque of the cylinders $P_{mS}$ that are not fired may be adjusted by varying the load-condition-specific opening periods of the respective gas outlets in the compression chamber of these cylinders of the combustion engine as a function of the particularities of the combustion engine. The drag torque may be increased (Equation 11)

$$P_{mS}\uparrow \ldots t_{Li}\Downarrow \qquad \text{Equation 11}$$

or reduced (Equation 12)

$$P_{mS}\Downarrow \ldots t_{Li}\uparrow \qquad \text{Equation 12}$$

This facilitates a controlled increase of the load state of the fired cylinder(s) of the combustion engine. This control mechanism prevents possible escaping of injected fuel resulting from a start of injection $t_{EHLi}$ that is earlier than the closing time $\alpha_{HLiS}$ of the gas outlet in the compression chamber of each cylinder of the combustion engine without a significant change of the air flow supplied to the combustion engine.

In the method according to the invention, the air and fuel quantities that are supplied to the combustion engine per cylinder and work cycle can be determined jointly, based on the load conditions, which makes it possible to modify numerous control processes towards an optimum for a load condition where the value of the parameter to be controlled moves in the direction of the load-condition-specific value. This provides advantages with regard to near-real-time modifications, for example to control idling, pinging, traction control, engine drag moment control, driving speed control, rotation speed or driving speed limitation or to achieve soft transitions when changing gears in automated or semi-automated gearboxes.

BRIEF DESCRIPTION OF THE SEVERAL
VIEWS OF THE DRAWINGS

Figure 2:
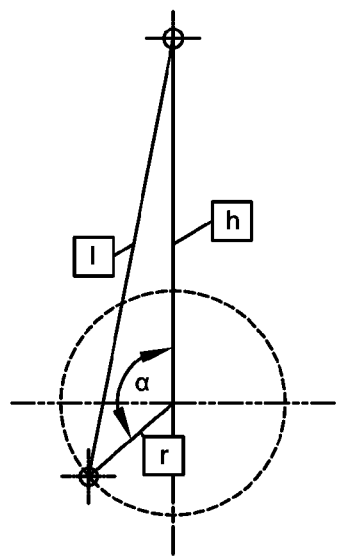
Figure 3:
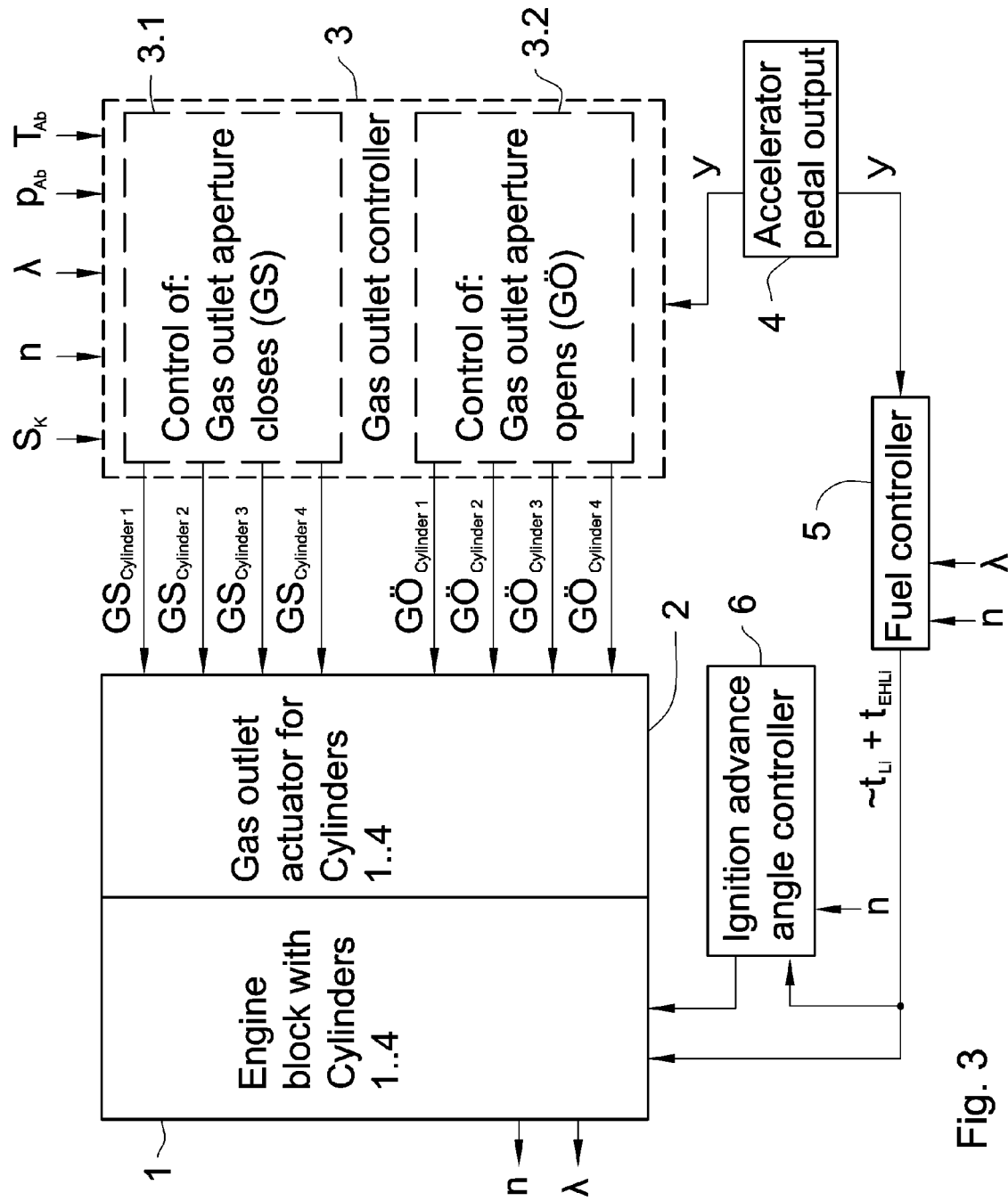
Figure 4:
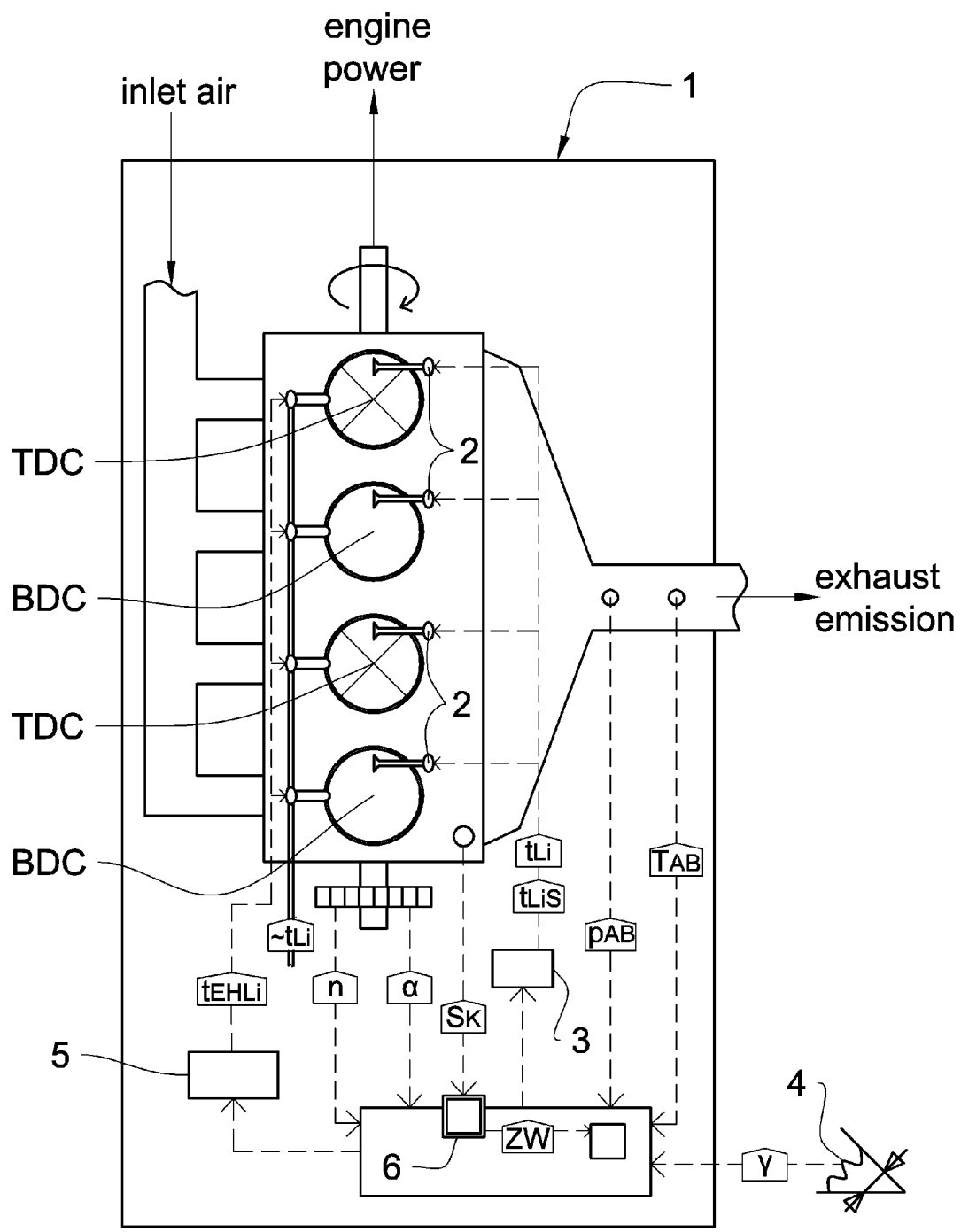

The invention is illustrated by examples in the following figures. They show:

FIG. 1: Schematic representation of the Seilinger process;

FIG. 2: Schematic representation of the crank drive of a combustion engine;

FIG. 3: Schematic block diagram of the controller for illustrating the methods according to the invention for controlling the air flow of a combustion engine; and FIG. 4: Schematic view of the present invention.

DETAILED DESCRIPTION OF THE INVENTION

During operation of the combustion engine 1 shown in FIG. 3 in the form of a block diagram, the air and fuel quantities supplied as well as the time of ignition are set load-condition-specific and cylinder-specific. In contrast with the implementation versions I and II, the controller 3 as well as the controller embodiment with regard to the load-condition-dependent adjustment of the air quantity that is supplied per work cycle to the cylinders of the combustion engine is implemented according to the invention. The air flow supplied to the combustion engine per work cycle and the cylinder is therefore controlled by using a gas outlet in the combustion chamber of each cylinder of the combustion engine, where the preferred embodiment of this gas outlet in the compression chamber of each cylinder of the combustion engine is integrated with the exhaust valve and involves controllable exhaust valves 2. Instead of controlling the intake air quantity per cylinder at every intake stroke, the control according to the invention is achieved by varying the opening period of the gas outlet in the compression chamber of each cylinder of the combustion engine during the compression stroke. This is controlled by the gas outlet controller 3, which is split into a GO (gas outlet opening) controller 3.2 and a GS (gas outlet closing) controller 3 in the embodiment shown (FIG. 3). The first unit passes cylinder-specific GO signals to an actuator for the gas outlet per cylinder, while the second device passes cylinder-specific GS signals to the actuator. The time GO is determined cylinder-specific and combustion-engine-specific according to the explanations provided above, taking the time for closing the intake valve(s) into account. The time GS is determined as a function of the load conditions, where the accelerator pedal signal output 4 provides the accelerator pedal signal ($\gamma$) and a combustion engine rotation speed meter, which is not shown in FIG. 3, provides the rotation speed. For combustion engines of Version I, the signal of the air flow meter or of an intake pipe pressure meter is often used. These measuring devices have dynamic errors, which are partially due to the type of sensors (flap air flow meter), the measuring principle (real-time character of the load signal evaluation—"updating error") or the physical design, i.e. the arrangement of the sensor in the intake pipe ("phase errors"). Such measuring devices and signal errors can be omitted according to the invention. The fact that, according to the invention, the intake pipe pressure is on average constant makes it easier to control the air flow supplied to the combustion engine, as the use of switching intake pipes or continuously adjustable intake pipes for the dynamic compensation of pressure waves, for example active air valves according to DE 19500501.5, can also be omitted. Due to the almost constant air flow for all load conditions of the combustion engine, which results from these measures, very accurate predictions can be made with regard to the load-condition-specific filling of the cylinders with air, taking the respective, set opening period of the gas outlet in the compression chamber of each cylinder of the combustion engine into account. The fuel controller 5 also uses the load conditions for changing the control variables. The load conditions are therefore the basis for the control of the fuel as well as of the air quantity supplied per cylinder and work cycle. If the lambda control detects differences between the two controllers, the control parameters are changed. Changes in the fuel quantity ($\sim t_{Li}$), the air quantity or of both control parameters are possible. This is indicated in FIG. 3 by the lambda signal ($\lambda$), which is supplied to both controllers. The control of the lambda value with the controller for controlling the gas outlet in the compression chamber of each cylinder of the combustion engine 3 has the advantage that a near-real-time response to the changes of the lambda value can be implemented. However, the control of the lambda value by control of the air flow supplied by work cycle and cylinder of the combustion engine is only possible in the partial load range, as these operating conditions do not involve maximum filling. The control of the lambda value under full load ($p_{mSoll,V}$) is achieved by manipulating the fuel quantity ($\sim t_{Li}$) when the gas outlet in the combustion chamber of each cylinder of the combustion engine is closed (see Equation 2).

The output signal of the fuel controller 5 is the key variable for representing the current load condition of the combustion engine, as it is usually adjusted in many ways (e.g. fuel, combustion engine or intake air temperature). Furthermore, the injected fuel quantity is the determining factor for the torque output of the combustion engine and therefore also for the respective advance angle (ZW). For this reason, the advance angle controller 6 receives the signal for the start of injection ($t_i$) and the quantity to be injected ($\sim t_{Li}$) as a load signal and provides an appropriate advance angle signal (ZW) for each cylinder and each work cycle of the combustion engine.

In the embodiment described, the combustion engine has additional pinging sensors (not shown in FIG. 3). They register the pinging per cylinder. If it is detected that pinging combustion takes place in one of the cylinders, the opening period of the gas outlet in the compression chamber of the cylinder is appropriately changed to stop the pinging. It follows that the previously common, advance-angle adjustment, which increased the fuel-consumption, can be omitted as a remedy for pinging.

It should be noted that the block diagram in FIG. 3 is only intended to illustrate the method for throttle-free control of the air flow of combustion engines as described above. In practical applications, the procedures described in this context are implemented with microprocessors, and not by circuit blocks that would correspond to the functional blocks in FIG. 3.

List of Symbols

| Symbol | Meaning |
| --- | --- |
| $\sim t_{Li}$ | Load-condition-dependent fuel quantity injected |
| h | Piston travel |
| H | Stroke of a piston |
| n | Rotation speed signal according to the rotation speed of the combustion engine |
| p | Pressure |
| $p_{Ab}$ | Pressure of the exhaust gases in the exhaust valve |
| $p_{Amax}$ | Highest pressure level in a cylinder of the combustion engine at the start of the compression stroke |
| $p_{Amin}$ | Lowest pressure level in a cylinder of the combustion engine at the start of the compression stroke |
| $p_{mS}$ | Cylinder-specific drag torque of unfired cylinders of the combustion engine |
| $p_{mSoll}$ | Desired load range of the combustion engine |
| $p_{mSoll,L}$ | Minimum possible load range of the combustion engine according to acceptance protocol |
| $p_{mSoll,V}$ | Maximum possible load range of the combustion engine according to the acceptance protocol |
| $p_Z$ | Pressure in a cylinder of the combustion engine |
| $p_{ZI}$ | Load-condition-dependent pressure in a cylinder of the combustion engine as a function of the crank angle, determined with indicator measurements |
| $p_{ZR}$ | Set pressure level in a cylinder of the combustion engine during the compression stroke |
| $t_{EHLi}$ | Start of injection as a function of load condition and cylinder |
| $t_i$ | Start of injection per cylinder as a function of the load condition |
| $t_{Li}$ | Load-condition-dependent opening period of the gas outlet in the compression chamber of each cylinder of the combustion engine in ms |
| $t_{LiS}$ | Load-condition-specific closing time of the gas outlet in the compression chamber of each cylinder of the combustion engine |
| V | Volume |
| $V_C$ | Volume of the compression chamber of a cylinder in the combustion engine |
| $V_H$ | Stroke volume of a cylinder of the combustion engine |
| $V_{HLi}$ | Load-condition-dependent stroke volume of a cylinder of the combustion engine |
| x | Distance between the piston bottom and the centre of the top end of the connecting rod |
| $\alpha$ | Crank angle |
| $\alpha_{HLi}$ | Load-condition-specific crank angle range at which the gas outlet in the compression chamber of each cylinder of the combustion engine is opened, in degree crank angle |

-continued

List of Symbols

| Symbol | Meaning |
| --- | --- |
| $\alpha_{HLiGO}$ | Load-condition-specific time for opening the gas outlet in the compression chamber of each cylinder of the combustion engine, in degree crank angle |
| $\alpha_{HLiGS}$ | Load-condition-specific time for closing the gas outlet in the compression chamber of each cylinder of the combustion engine, in degree crank angle |
| $\alpha_{HLiO}$ | Load-condition-specific crank angle at the time EO |
| $\alpha_{HLiS}$ | Load-condition-specific crank angle at the time ES |
| $\gamma$ | Measured accelerator pedal signal corresponding to the position of the accelerator pedal |
| $T_{Ab}$ | Exhaust gas temperature |
| $S_k$ | Signal of a pinging sensor |

The invention claimed is:

1. A method for controlling the air flow of a combustion engine with direct fuel injection and at least one intake and one exhaust device per cylinder, said method comprising the steps of:
   providing a combustion engine having cylinders each including a combustion chamber, at least one controllable gas outlet per cylinder attachable to said compression chambers of said cylinders of said combustion engine, and at least one exhaust device attachable to each of said cylinders of said combustion engine, said exhaust device having exhaust valves;
   registering an accelerator pedal signal with a value ($\gamma$) depending on the position of said accelerator pedal, said accelerator pedal signal being registered by an accelerator pedal position sensor;
   registering a rotation speed signal with a value (n) depending on the rotation speed of said combustion engine, said rotation speed signal being registered by a rotation speed sensor which determines the rotation speed of a crank shaft of said combustion engine;
   defining load conditions using said value ($\gamma$) and value (n);
   determining a load-condition-dependent opening period ($t_{Li}$) of said gas outlet in said compression chamber of each cylinder of said combustion engine during the compression stroke;
   determining a load-condition-dependent fuel injection quantity ($\sim t_{Li}$) per work cycle and cylinder; and
   determining advance angles (ZW) as a function of said load conditions.

2. The method as set forth in claim 1, wherein said advance angles (ZW) are determined as a function of engine rotation speed (n) and a fuel quantity signal ($\sim t_{Li}$).

3. The method as set forth in claim 2, wherein said different opening periods ($t_{Li}$) for said respective gas outlets in said compression chamber are determined for different cylinders in a way that all fired cylinders are supplied with approximately the same quantity of fuel-air mixture.

4. The method as set forth in claim 3 further comprising the step of closing said gas outlet in said compression chamber for each of said respective cylinder having a critical partial-load condition.

5. The method as set forth in claim 4 further comprising the step of changing said opening periods ($\sim t_{Li}$) of said gas outlets in said compression chambers of unfired cylinders if a partial-load signal is present, and performing load control for the fired cylinder within defined limits.

6. The method as set forth in claim 5 further comprising the step of choosing the start of opening (GO) of said gas outlet in said compression chamber of each cylinder of said combustion engine in such a way that an exhaust gas counter pressure is greater than the pressure in said cylinder to enable exhaust gas recycling.

7. The method as set forth in claim 6 further comprising the step of modifying the accelerator pedal signal by an engine controller to control operating parameters of said combustion engine so that an operating variable to be controlled moves in the direction of the desired target value for said operating parameter, said operating parameters being selected from the group consisting of advance angle (ZW), fuel quantity injected, injection time, closing time of said gas outlet, and closing time of an exhaust valve.

8. The method as set forth in claim 7 further comprising the step of monitoring possible pinging of said combustion engine at each cylinder, and setting said opening periods ($\sim t_{Li}$) of said gas outlets in said compression chamber of each cylinder of said combustion engine to prevent pinging.

9. The method as set forth in claim 8 further comprising the step of using said exhaust valve to control the function of said gas outlet for adjusting the air quantity in each cylinder during the compression stroke.

10. The method as set forth in claim 9, wherein said air quantity in said cylinder is determined by measuring exhaust gas pressure ($P_{Ab}$) downstream of said gas outlet during the compression stroke.

11. The method as set forth in claim 10, wherein said opening period ($t_{Li}$) and the opening stroke of said gas outlet during the compression stroke is controlled as a function of said exhaust gas pressure signal ($P_{Ab}$), said engine speed (n) and said accelerator pedal position ($\gamma$).

12. The method as set forth in claim 10, wherein said opening period ($t_{Li}$) and the opening stroke of said gas outlet during the compression stroke is determined by the pinging limit of said combustion engine in a way that said opening period ($t_{Li}$) or said opening stroke are stepwise increased until fuel pinging occurs and said opening period ($t_{Li}$) and opening stroke that was determined one step before the pinging occurred is set as the maximum value.

13. The method as set forth in claim 1 further comprising the step of maintaining a constant exhaust gas temperature ($T_{Ab}$) during a regeneration process of a particle filter in an exhaust pipe, the engine load and the exhaust temperature are increased by increasing said opening period ($t_{Li}$) and the opening stroke of said gas outlet of each cylinder during the exhaust stroke, which increases said exhaust gas temperature ($T_{Ab}$) and the engine load, said opening period ($t_{Li}$) and the opening stroke are controlled as a function of said exhaust temperature ($T_{Ab}$) until said regeneration process is completed.

14. The method as set forth in claim 1 further comprising the step of sending control signals for controlling the air flow of said combustion engine to said actuators for said gas outlet device and exhaust valves as well as injection valves by said integrated engine control system via an electronic interface.

15. The method as set forth in claim 1 further comprising the step of determining an error in the control of the air flow by a diagnostic function module, said errors are archived in a memory system of said engine controller in readable form.

16. The method as set forth in claim 1 further comprising the step of determining a braking moment of said combustion engine in a push mode by controlling said opening period ($t_{Li}$) and said opening stroke of said exhaust valves during an exhaust stroke, where the compression of combustion gasses that determines said braking moment is adjusted by reducing said opening period ($t_{Li}$) and reducing the exhaust valve stroke.

17. A method for controlling the air flow of a combustion engine, said method comprising the steps of:

providing a combustion engine having a work cycle, a crank shaft, cylinders, a combustion chamber for each cylinder, at least one controllable gas outlet device attachable to said compression chambers of said cylinders, and at least one exhaust device attachable to each of said cylinders of said combustion engine, said gas outlet device and exhaust device each having actuators, said exhaust device having exhaust valves;

providing at least one accelerator pedal position sensor, at least one rotation speed sensor, at least one pressure sensor, at least one pinging sensor, at least one temperature sensor, and an engine controller having an integrated control unit;

registering an accelerator pedal signal with a value ($\gamma$) depending on the position of said accelerator pedal, said accelerator pedal signal being registered by said accelerator pedal position sensor;

registering a rotation speed signal with a value (n) depending on the rotation speed of said combustion engine, said rotation speed signal being registered by said rotation speed sensor which determines the rotation speed of said crank shaft of said combustion engine;

defining load conditions using said value ($\gamma$) and value (n);

determining a load-condition-dependent opening period ($t_{Li}$) of said gas outlet device in said compression chamber of said each cylinder of said combustion engine during a compression stroke;

determining a load-condition-dependent fuel injection quantity ($\sim t_{Li}$) per said work cycle and cylinder;

determining advance angles (ZW) as a function of said load conditions;

sending control signals for controlling the air flow of said combustion engine to said actuators for said gas outlet device and exhaust valves as well as injection valves by said integrated engine control system via an electronic interface;

determining an error in the control of the air flow by a diagnostic function module, said errors are archived in a memory system of said engine controller in readable form;

monitoring any pinging of said combustion engine at each cylinder, and setting said opening periods ($t_{Li}$) of said gas outlet device in said compression chamber of each cylinder of said combustion engine to prevent pinging; and determining a braking moment of said combustion engine in a push mode by controlling said opening period ($t_{Li}$) and said opening stroke of said exhaust valve during an exhaust stroke, where the compression of combustion gasses that determines said braking moment is adjusted by reducing said opening period ($t_{Li}$) and reducing said valve stroke.

18. A device for controlling the air flow of a combustion engine having cylinders each including a combustion chamber, and a work cycle, said device comprising:

at least one controllable gas outlet per cylinder attachable to said combustion chambers of said cylinders, said gas outlet is a controllable fuel injection device;

at least one exhaust device per cylinder attachable to said combustion chamber of said cylinder;

at least one accelerator pedal position sensor for determining the position of an accelerator pedal;

at least one rotation speed sensor for determining the rotation speed of a crank shaft of said engine;

at least one temperature sensor for determining the temperature in said exhaust gas device;

at least one pressure sensor that measures the pressure downstream of said gas outlet of each cylinder; and an engine controller having an integrated control unit with algorithms for determining air flow, said engine controller provides signals that determine an opening period and valve stroke of said gas outlet.

19. The device as set forth in claim 18, wherein said gas outlet and exhaust device each of which further comprising actuators for controlling the opening period of their respective said gas outlet and exhaust device, said actuators being controlled by output signals of said engine controller.

20. The device as set forth in claim 19 further comprising a pinging sensor for determining any pinging of said engine, wherein said engine controller sends signals to said actuators for said gas outlet and exhaust devices of each cylinder during a compression stroke to set a compression ratio of said combustion engine, and wherein the setting of said compression ratio by said engine controller is a function of the signal of said pinging sensor.

21. The device as set forth in claim 20, wherein said integrated control unit of said engine controller contains a device for approximate calculation of a desired fuel/air ratio based on the current engine operating conditions that are determined by said accelerator pedal position, rotation speed, pressure, temperature, and pinging sensors, and wherein said approximate calculation device is connected to said actuators and to a fuel control device and sends a control signal to said actuators for said gas outlet or exhaust devices of said cylinders as well as to said fuel control device to set said fuel/air ratio so that it corresponds to said desired fuel/air ratio, before pressure measurements are performed by said pressure sensor in said exhaust device.

\* \* \* \* \*